(12) United States Patent
Hüttinger et al.

(10) Patent No.: US 6,404,331 B1
(45) Date of Patent: Jun. 11, 2002

(54) FUEL-LEVEL INDICATOR FOR A MOTOR VEHICLE FUEL TANK

(75) Inventors: Roland Hüttinger, Bieswang; Jachin Schwalbe, Braunschweig, both of (DE)

(73) Assignee: Alfmeier Präzision AG Baugruppen und Systemlösungen, Treuchtlingen (DE)

( * ) Notice: Subject to any disclaimer, the term of this patent is extended or adjusted under 35 U.S.C. 154(b) by 0 days.

(21) Appl. No.: 09/609,309

(22) Filed: Jun. 30, 2000

(30) Foreign Application Priority Data

Jun. 30, 1999 (DE) ..................... 299 11 402 U
Jul. 17, 1999 (DE) ..................... 299 12 523 U

(51) Int. Cl.⁷ .............................. B60Q 1/00
(52) U.S. Cl. ............... 340/450; 340/618; 340/620; 73/304 R; 73/290 R; 338/309
(58) Field of Search ............... 340/618, 612, 340/620, 623, 625, 450; 338/162, 195, 309; 73/305, 308, 317, 319, 304 R, 290 R

(56) References Cited

U.S. PATENT DOCUMENTS

| 4,627,283 | A | * | 12/1986 | Nishida et al. ............... 73/313 |
| 4,827,769 | A | * | 5/1989 | Riley et al. ................... 73/313 |
| 4,967,181 | A | * | 10/1990 | Iizuka et al. ............. 340/450.2 |
| 5,022,263 | A | * | 6/1991 | Uriu et al. ..................... 73/295 |
| 5,051,719 | A | * | 9/1991 | Gaston et al. .............. 338/162 |
| 5,146,785 | A | * | 9/1992 | Riley .......................... 73/313 |
| 5,743,136 | A | * | 4/1998 | Gaston et al. ................ 73/313 |
| 5,746,088 | A | * | 5/1998 | Sawert et al. ................. 73/317 |

\* cited by examiner

Primary Examiner—Julie Lieu
(74) Attorney, Agent, or Firm—Venable; Gabor J. Kelemen

(57) ABSTRACT

A fuel-level indicator for a motor vehicle fuel tank includes an insulating base carrier; an electrically conducting slide track mounted on the base carrier and containing at least one metal; and a movable transmitter arm carrying a slide contact and being in sliding engagement with the slide track. The slide track is free from silver.

5 Claims, 2 Drawing Sheets

FUEL-LEVEL INDICATOR FOR A MOTOR VEHICLE FUEL TANK

CROSS-REFERENCE TO RELATED APPLICATION

This application claims the priority of German Patent Application Nos. 299 11 402.3, filed on Jun. 30, 1999 and 299 12 523.8, filed on Jul. 17, 1999, the subject matter of which is incorporated herein by reference.

BACKGROUND OF THE INVENTION

The present invention relates to a fuel-level indicator for the fuel tank of a motor vehicle. Indicators of this type comprise a transmitter arm, one end of which is provided with a float while the other end is rotatably supported. In most cases, two sliding contacts, fixed on the transmitter arm, make contact with a thick-film resistor. Depending on the angular position of the transmitter arm, the contacts are at different locations on the thick-film resistor, which results in different resistance values. Specific fuel-level values are assigned to the resistance values with the aid of a suitable calibration.

Thick-film resistors for fuel-level indicators comprise, for example, a ceramic base carrier and at least one electrically conducting slide track which is applied to the base carrier and which is engaged by a sliding contact. The slide track is applied in the form of a paste containing silver or mixtures of silver and other precious metals, such as palladium. Such pastes are produced by the firms DuPont and Heraeus. With the aid of a sintering process or a heat treatment, the pastes harden to form a wear-resistant, porous layer. The addition of fiber-type silicate or glass particles further increases the mechanical stability as well as the wear-resistance of such layer. Fuel-level indicators having thick-film resistors of the above-noted type have so far been resistant to the standard types of fuel and have retained their initial indicating accuracy over a long operating time.

Recently, however, problems have been observed with the fuel indication. Tests have shown that the observed problems and the inaccuracies in the indication occur with polyethylene fuel tanks which have been treated with fluorinated gas for rendering the tanks impermeable to fuel vapors.

SUMMARY OF THE INVENTION

It is an object of the invention to provide an improved fuel-level indicator which can be used without problems in fluoridated polyethylene fuel tanks.

This object and others to become apparent as the specification progresses, are accomplished by the invention, according to which, briefly stated, the fuel-level indicator for a motor vehicle fuel tank includes an insulating base carrier; an electrically conducting slide track mounted on the base carrier and containing at least one metal; and a movable transmitter arm carrying a slide contact and being in sliding engagement with the slide track. The slide track is free from silver.

The invention is based on the discovery that the elemental bonded sulfur present in standard types of fuel or the covalently bonded sulfur in the fuel constituents results in the forming of silver sulfide if fluor is present. The more the silver in the thick-film resistor is replaced by silver sulfide, the more the conductivity of the resistor is changed. To be sure, only traces of the fluor are present in the fluoridated polyethylene (PE) tanks, but these traces suffice to cause an unacceptable change in the resistance of the thick-film resistor.

It is a further advantage of the fuel-level indicator according to the invention that it can also be used without problems for those types of fuel which have been de-sulfurized with hydrogen. The hydrogen sulfide that forms during such a treatment which is performed for reasons of environmental protection, is removed from the fuel, except for a practically unavoidable residual proportion. In conventional thick-film resistors containing silver, the hydrogen sulfide residue causes silver sulfide to form, thus resulting in errors in the fuel-level indication. The fuel-level indicator according to the invention prevents silver sulfide from forming. Other metals that can be used for thick-film resistors, such as gold and platinum, are converted to their sulfides under the above-noted conditions in fluoridated PE tanks or in the presence of hydrogen sulfide. Particularly wear-resistant thick-film resistors can be obtained with a mixture of gold and platinum.

DESCRIPTION OF THE PREFERRED EMBODIMENT

Figure 1:
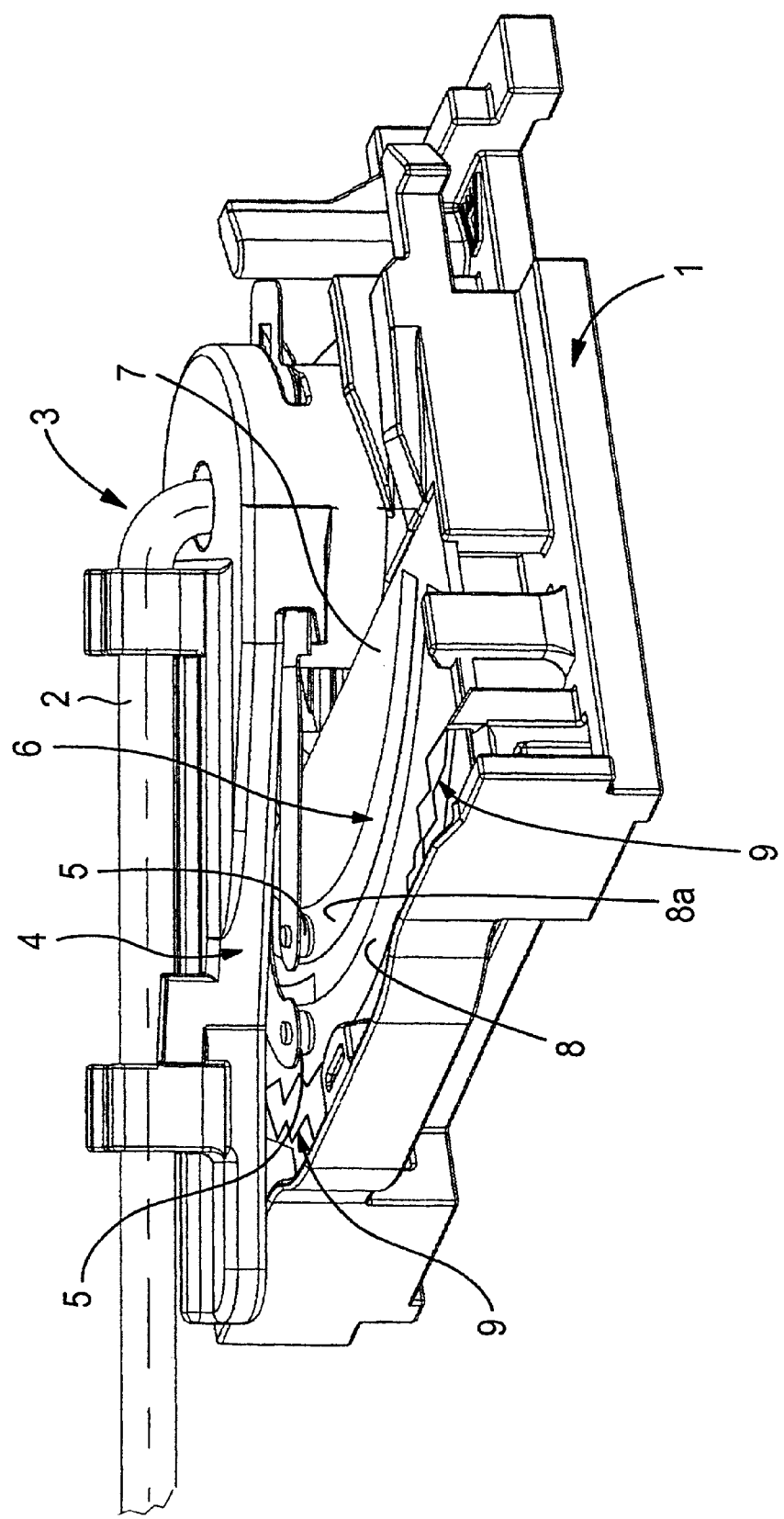
FIG. 1 is a perspective view of a fuel-level indicator incorporating the invention.

FIG. 1 shows a fuel-level indicator having an essentially plate-shaped base body 1 of plastic material, in which one end 3 of a transmitter arm 2 is rotatably supported. A contact carrier 4, secured to,the transmitter arm 2, has two sliding contacts 5 arranged on its underside. The sliding contacts 5 cooperate with a thick-film resistor 6. The thick-film resistor comprises a ceramic plate 7 as a base body, which supports two slide tracks 8, 8a. While the slide track 8a is applied directly to the ceramic plate 7, a resistor track 9 is arranged between the ceramic plate 7 and the slide track 8. The resistor track 9 is electrically connected to the slide track 8.

Figure 2:
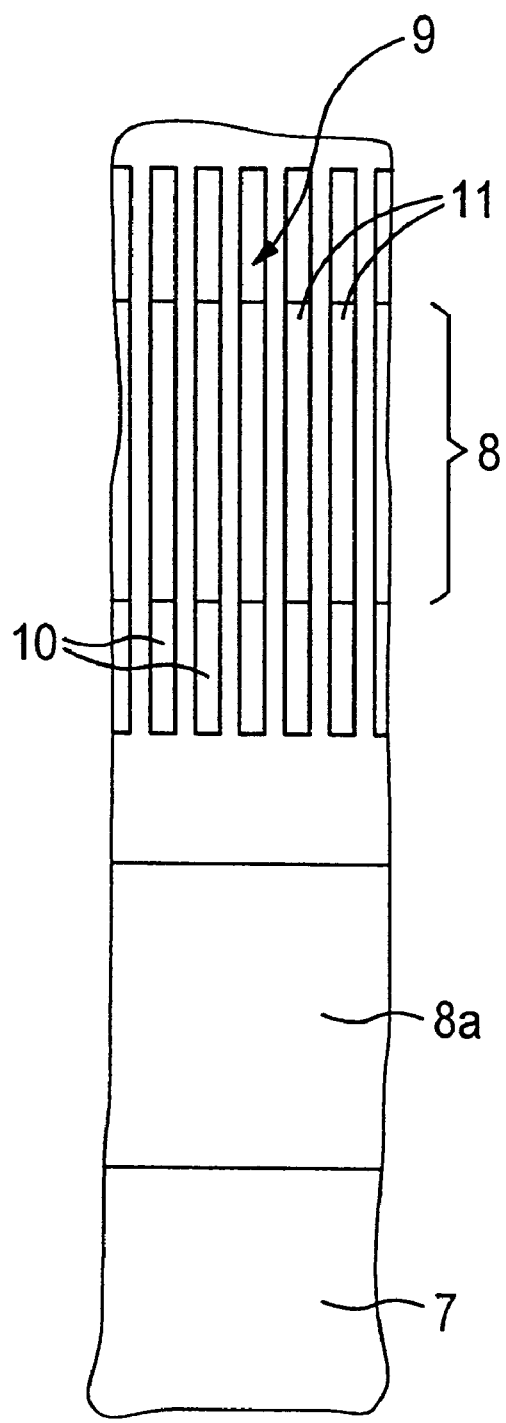
FIG. 2 is a fragmentary sectional view of an enlarged detail of the thick-film resistor forming part of the fuel-level indicator according to the invention 1.

Turning to FIG. 2, the resistor track 9 is composed of a plurality of webs 10, for which the resistance value is defined by unlike web lengths. The slide track 8 that is affixed to the resistor track 9 is likewise composed of a plurality of webs 11.

According to the invention the slide tracks 8 and 8a are free from silver; they may contain, for example, gold, platinum or a mixture thereof.

It will be understood that the above description of the present invention is susceptible to various modifications, changes. and adaptations, and the same are intended to be comprehended within the meaning and range of equivalents of the appended claims.

What is claimed is:

1. In a fuel-level indicator for a motor vehicle fuel tank, including
   an insulating base carrier;
   an electrically conducting slide track mounted on the base carrier and containing at least one metal; and
   a movable transmitter arm carrying a slide contact and being in sliding engagement with the slide track;
   the improvement wherein said slide track is free from silver and contains gold.

2. The fuel-level indicator as defined in claim 1, wherein said slide track contains gold as a single metal.

3. The fuel-level indicator as defined in claim 1, wherein said slide track further contains platinum.

4. In a fuel-level indicator for a motor vehicle fuel tank, including an insulating base carrier;

an electrically conducting slide track mounted on the base carrier and containing at least one metal; and a movable transmitter arm carrying a slide contact and being in sliding engagement with the slide track; the improvement wherein said slide track is free from silver and contains platinum.

5. The fuel-level indicator as defined in claim 4, wherein said slide track contains platinum as a single metal.

* * * * *